United States Patent [19]

West

[11] Patent Number: 4,716,923
[45] Date of Patent: Jan. 5, 1988

[54] APPARATUS FOR MANIPULATING PARALLEL FLUID FLOW CIRCUITS

[76] Inventor: Robert E. West, 9700 Academy Rd., NW., Albuquerque, N. Mex. 87114

[21] Appl. No.: 879,411

[22] Filed: Jun. 27, 1986

[51] Int. Cl.⁴ .......................................... F16K 11/06
[52] U.S. Cl. ............................ 137/312; 137/625.19; 137/625.29; 137/625.32; 137/625.47
[58] Field of Search .......... 137/599.1, 625.19, 625.29, 137/625.32, 625.47, 312

[56] References Cited

U.S. PATENT DOCUMENTS

| | | | |
|---|---|---|---|
| 2,154,945 | 4/1939 | Kyes | 137/625.19 X |
| 2,934,090 | 4/1960 | Kenann et al. | 137/312 X |
| 3,098,506 | 7/1963 | Spragens | 137/625.19 |
| 3,394,735 | 7/1968 | Wurster | 137/625.32 |
| 3,499,467 | 3/1970 | McCord et al. | 137/625.19 |
| 3,744,512 | 7/1973 | Billman | 137/312 X |
| 3,865,139 | 2/1975 | Tolnai | 137/625.19 |
| 4,015,816 | 4/1977 | Semon | 251/309 X |
| 4,173,234 | 11/1979 | Thomas et al. | 251/181 X |
| 4,355,659 | 10/1982 | Kelchner | 137/625.19 |
| 4,501,295 | 2/1985 | Williams et al. | |

FOREIGN PATENT DOCUMENTS 921912  3/1963  United Kingdom ........... 137/625.32

Primary Examiner—Gerald A. Michalsky
Attorney, Agent, or Firm—Deborah A. Peacock

[57] ABSTRACT

Apparatus for manipulating at least two fluid flow circuits comprising a manifold, and a valve stem assembly with at least two stages in series, with each stage comprising a valve relief for communicating with at least two inlet and outlet ports, and a seal for blocking off or isolating a port. The apparatus of the invention allows at least two fluid flow circuits to be connected to the manifold in a parallel configuration to operate in a redundant manner. If the conduit or a fluid control or monitoring device within a circuit fails or requires maintenance, that particular circuit may be isolated from the process flow system by the multiple flow directing capability of the apparatus. Use of the apparatus of the invention enables the removal of valve devices or conduit in a circuit for repair or replacement without interrupting the on-line process fluid flow.

6 Claims, 7 Drawing Figures

APPARATUS FOR MANIPULATING PARALLEL FLUID FLOW CIRCUITS

BACKGROUND

This invention relates to an apparatus for use in controlling the flow of process fluids and/or the monitoring of fluid properties. These fluids may be gaseous, vapor or liquid. The controlled process fluid may either be transferring its power to some other device or it may be in transit to other destinations.

The petroleum and chemical process, power generation, aerospace, and transportation industries require high reliability in emergency shutdown, safety, and critical control and monitoring systems. Conventional multiposition valves and manifolds, currently available, are not capable of simultaneously isolating and connecting both the inlet and outlet ports of parallel fluid control devices, as a single unit. When a fluid control device, such as a valve, is in need of repair, the entire process line containing that valve must often be shut down. Such shutdowns, using prior art valves and lines, cause a loss in manufacturing time, and often higher wear on equipment.

Several valves have been developed in the prior art to prevent the shutdown of process lines. U.S. Pat. No. 2,570,897, entitled "SHUTTLE VALVE," to Winchester, discloses a switching valve operated by hydraulic fluid, for controlling the amount of fluid which is sent to a particular port. U.S. Pat. No. 3,380,479, entitled "VALVE ASSEMBLY AND ACTUATING LINKAGE THEREFOR," to Bassan et al., discloses a valve stem assembly comprising bellows valves. U.S. Pat. No. 4,501,295, entitled "TRANSFER VALVE," to Williams et al., discloses a multiple-port switching valve device for large lines. The '295 patent discloses a valve stem assembly containing multiple, complex parts. All of these prior art devices are complicated to manufacture and often difficult to operate.

Accordingly, it is an object of this invention to provide a reliable apparatus for isolating at least one fluid flow circuit without interrupting the overall function of the control or measurement system or process flow.

It is another object of the invention to provide an apparatus which is easy and inexpensive to manufacture and easy to operate.

Other objects and further scope of applicability of the present invention will become apparent from the detailed description to follow, taken in conjunction with the accompanying drawing.

SUMMARY OF THE INVENTION

This invention relates to a valve apparatus for isolating and manipulating fluid flow circuits. Use of the apparatus of the inventions allows for increased reliability of fluid control or monitoring devices.

The apparatus of the invention comprises a manifold and a valve stem assembly in the interior of the manifold. The manifold comprises inlet and outlet ports which are radially arranged around the manifold and which communicate with the valve stem assembly. The valve stem assembly comprises at least two stages, with a valve relief at each stage. The valve relief allows fluids to flow through connecting ports. The apparatus further comprises sealing means attached to the valve stem assembly for blocking off or isolating the fluid flow from one port in each stage. The apparatus further comprises selecting means for rotating the valve stem assembly with respect to various ports. The selecting means rotates the valve stem assembly into a position in which designated ports can be sealed. By sealing these ports, a particular fluid flow circuit is taken off line for inspection or repairs, without interrupting the fluid flow through the other circuits. Preferably, the apparatus comprises at least a three-way flow configuration, so that two circuits may act in a redundant manner for increased reliability.

DESCRIPTION OF THE PREFERRED EMBODIMENT

Figure 1:
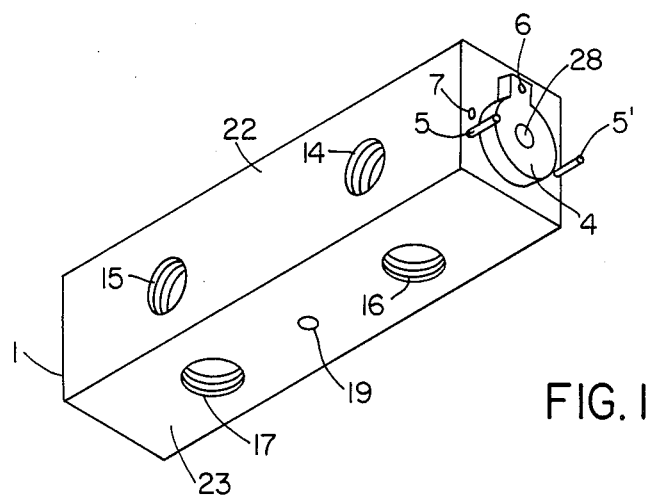
FIG. 1 is an isometric view of the preferred two-stage, three-way flow apparatus of the invention, showing left side and bottom side inlet and outlet ports, and switching means.
Figure 2:
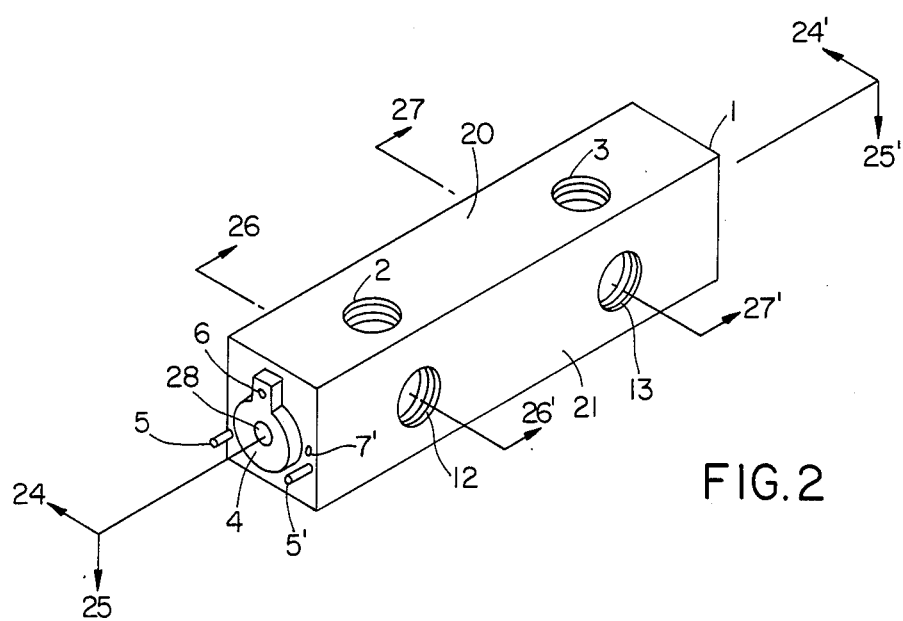
FIG. 2 is an isometric view of the preferred two-stage, three-way flow apparatus of the invention, showing top side and right side inlet and outlet ports, and switching means.

The present invention relates to an apparatus for manipulating fluid flow circuits and devices, such as fluid control or monitoring devices. FIGS. 1 and 2 are isometric views of a preferred embodiment of the present invention, showing a two-stage, three-way flow apparatus. FIGS. 3-7 are section views showing the preferred apparatus of FIGS. 1 and 2. The apparatus of the invention comprises a manifold 1, said manifold comprising a system inlet port 2 and a system outlet port 3. The apparatus of the invention further comprises switching means 4 for selecting and directing fluid flow. Preferably, the switching means 4 comprises position locking means to lock the switching means 4 into place after a fluid flow system or circuit has been selected. FIGS. 1 and 2 illustrate pin 6 and socket 7 and 7' locking means. Other means for locking the position of the switching means 4, common to the art, may also be used in conjunction with the apparatus of the invention. The switching means 4 is illustrated in FIGS. 1 and 2 as a "key" shape. This key shape is preferred for a three-way flow apparatus to allow ease of operation of the apparatus, although other shapes which can accomplish rotation are also useful. Preferably, the apparatus further comprises travel-limiting or rotation-limiting means to stop the rotation of the switching means when it has reached its destination. For a three-way flow apparatus and a key-shaped switching means 4, the preferred travel-limiting means are pins 5 and 5', as shown in FIGS. 1 and 2. When the top of the key-shaped switching means 4 rotates either clockwise (to pin 5' in FIGS. 1 and 2) or counterclockwise (to pin 5 in FIGS. 1 and 2), the rotation is stopped by the travel-limiting means. Arrows and indicators, or other means common to the art, may also be used to signal an operator when to cease rotating the switching means 4. Travel-limiting means are preferred to minimize operator error.

The apparatus of the invention further comprises a valve stem assembly 8, which fits into the interior of the manifold 1. Attachment means 28, such as a screw, attach the valve stem assembly 8 to the switching means 4. The valve stem assembly 8 comprises one valve stage relief for each stage 9 and 9'. The valve stage reliefs 9 and 9' allow fluid to flow into at least one circuit, depending on the rotational position of the switching means 4. Each fluid flow circuit may contain valve devices, connected in series, parallel, or a combination pattern.

For a three-way flow apparatus, the valve stage reliefs 9 and 9' are fabricated such that three adjacent ports may be in simultaneous communication with each other. For example, when the switching means 4 is in an upward position (the position shown in FIGS. 1 and 2), the fluid will flow through ports 2, 12, and 14, and 3, 13, and 15. The fluid ports 16 and 17 would be isolated from fluid flow and thus any valve devices connected to or contained on this circuit could be repaired without interrupting on-line fluid flow. If the switching means 4 is rotated clockwise to travel-limiting means 5', fluid will flow through ports 2, 12, and 16, and 3, 13, and 17: Fluid will not flow through ports 14 and 15. Similarly, if the switching means 4 is rotated counterclockwise to travel-limiting means 5, fluid will flow through ports 2, 14, and 16, and 3, 15, and 17: Fluid will not flow through ports 12 and 13. The above example is for a three-way flow apparatus. The same principle of operation would apply to a two-way flow apparatus, or a multiple (which is greater than three) -way flow apparatus. For example, if the manifold 1 shown in FIGS. 1 and 2 were missing ports 16 and 17 on the bottom of the manifold 1, either of the side port fluid circuits could be isolated by rotation of the switching means either clockwise or counterclockwise.

Ports for connecting valve devices or circuit conduit may utilize pipe thread, machine thread, weld socket, flanges or any attachment means, common to the art. Threading is shown in all ports of the drawing. For simplicity, the top of the manifold 20 containing ports 2 and 3 is hereinafter referred to as the "top side," the side of the manifold 21 containing ports 12 and 13 is hereinafter referred to as the "right side," the side of the manifold 22 containing ports 14 and 15 is hereinafter referred to as the "left side," and the bottom of the manifold 23 containing ports 16 and 17 is hereinafter referred to as the "bottom side."

The apparatus of the invention further comprises at least one axial sealing means per stage 10 and 10' which isolates outer stages from the exterior of the manifold 1, and at least one inner axial sealing means per stage 11 and 11' which isolates successive valve stages from each other. These axial sealing means 10, 10', 11 and 11' encircle the valve stem assembly 8. O-rings are useful as axial sealing means in the apparatus of the invention.

FIGS. 1-4 illustrate a two-stage apparatus of the invention in which one stage represents fluid flow through ports 2, 12, 14 and 16, and the second stage represents fluid flow through ports 3, 13, 15 and 17. More than two stages are useful for multiple fluid flow circuits in series. The apparatus of the invention may comprise more than two stages as a unit, or several apparatuses of the invention could be easily joined to increase the number of stages. Flow between stages could be internal or external to the manifold. Preferably, the apparatus comprises a stage vent hole 19 (see FIG. 1) between stages for venting and detecting any leakage past the inner axial sealing means 11 and 11'.

The apparatus of the invention further comprises valve sealing means 18 attached to the valve stem assembly 8 and positioned opposite each valve stage relief 9 to prevent the fluid from flowing past the valve sealing means 18 into the particular circuit being sealed. The valve sealin9 means 18 are preferably of a resilient material for good sealing. The valve sealing means 18 may be set into a machined receptacle in the valve stem assembly 8 or affixed to the outer surface of the valve stem assembly. One type of valve sealing means, useful in the present invention, is a circumferencial seat seal, as shown in FIGS. 3, and 5-7.

Figure 5:
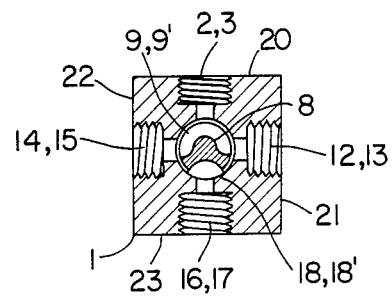
FIG. 5 is an end elevation section view taken along line 26,26' and line 27,27' with the switching means in an upward position.
Figure 6:
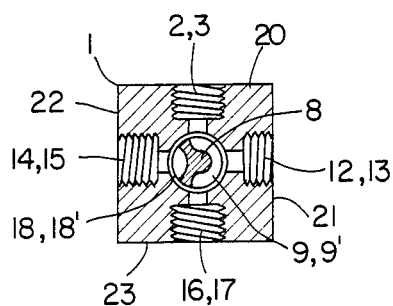
FIG. 6 is an end elevation section view illustrating the position of the switching means in a clockwise rotational position.
Figure 7:
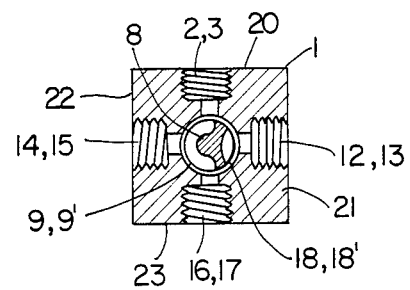
FIG. 7 is an end elevation section view illustrating the position of the switching means in a counterclockwise rotational position.

Preferably, the valve stem assembly 8 is manufactured from a single piece, such as bar stock. Such a design minimizes manufacturing and repair costs. Preferably, grooves, machined into the valve stem assembly, provide the valve reliefs 9 and 9'. Preferably the valve reliefs 9 and 9' are designed to minimize a flow restriction and pressure drop when the fluid flows in and out of the valve reliefs 9 and 9'. FIGS. 5-7 illustrate a preferred circular or "bell"-shaped design of the valve assembly 8 and reliefs 9 and 9' to enhance fluid flow in a three-way flow apparatus.

Figure 3:
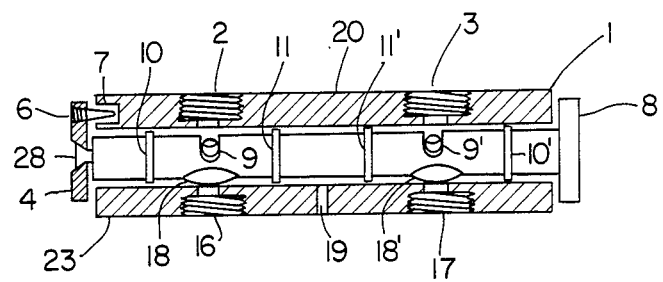
FIG. 3 is a side elevation section view taken along line 24,24' of FIG. 2, illustrating the relative position of the valve stem assembly with respect to the ports of the manifold.
Figure 4:
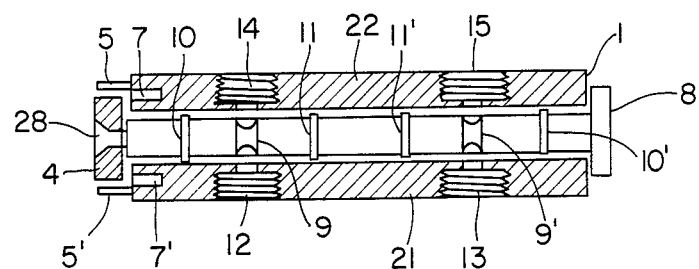
FIG. 4 is a plan section view taken along line 25,25' of FIG. 2, illustrating the relative position of the valve stem assembly with respect to the ports of the manifold.

FIGS. 3-7 are useful to illustrate the operation of the apparatus of the invention. FIG. 3 is a side elevation section view taken along the line 24,24' of FIG. 2, when the selecting means 4 is in an upward position (pointing directly towards the top side 20). FIG. 3 shows the sealing means 18 and 18' blocking or isolating ports 16 and 17 on the bottom side 23. The fluid enters system inlet port 2 into the first-stage relief 9; flows through ports 12 and 14 and out of the manifold 1 into a process circuit; flows back into the manifold 1; flows through ports 13 and 15 into the second stage relief 9'; and flows out of the system through system outlet port 3. Valve devices or conduit connected to ports 16 and 17 are thereby effectively isolated from the on-line fluid flow, and can be inspected, replaced, or repaired without interrupting the process fluid flow.

FIGS. 5-7 illustrate the effect of positioning the switching means 4 of FIG. 2 in all three switching positions. FIG. 5 is an end elevation section view taken along line 26, 26' of FIG. 2. FIG. 5 illustrates the positioning of the switching means 4 in an upward position (pointing towards the top side 20). In this position, the valve sealing means 18 and 18' block or isolate ports 16 and 17 from fluid flow. This upward position of the switching means 4 is illustrated in FIGS. 1-4. FIG. 6 (an end elevation section view) illustrates the operation of the apparatus of the invention when the switching means 4 is rotated clockwise to the right side 21. In this position, ports 14 and 15 are isolated. Likewise, FIG. 7 (an end elevation section view) illustrates the operation of the apparatus of the invention when the switching means 4 is rotated counterclockwise to the left side 22. In this position, ports 12 and 13 are isolated. All three fluid flow circuits are in parallel to allow the isolation of any one of the circuits. A primary advantage of the invention is that when the switching means 4 is changed to a new position, the transfer may be made without even a momentary interruption in service, otherwise referred to as "bumpless." The apparatus of the invention preferably allows for at least three parallel fluid flow circuits, so that two of the three circuits can simultaneously monitor or control the fluid flow, while the third circuit is isolated.

Accordingly, the present invention provides a novel apparatus which, as a single unit, aids in the manipulation of fluid devices by simultaneously isolating or connecting the inlet and outlet ports of two or more fluid devices connected in parallel circuits. Use of the apparatus of the invention enables any one circuit to be taken off-line for repairs, additions, or inspection, without interrupting the intended service. The apparatus is inexpensive to manufacture and easy to operate and repair.

Although the invention has been described with reference to its preferred embodiment, other embodiments can achieve the same results. Variations and modifications of the present invention will be obvious to those skilled in the art and it is intended to cover in the appended claims all such modifications and equivalents.

I claim:

1. An apparatus for manipulating parallel fluid flow circuits, said apparatus comprising:
   (a) a manifold comprising at least one set of radial system ports consisting of an inlet port and at least two additional ports which correspond to the inlet port and which are positioned radially adjacent to the inlet port, and at least one set of radial system ports consisting of an outlet port and at least two additional ports which correspond to the outlet port and which are positioned radially adjacent to the outlet port;
   (b) a valve stem assembly, positioned in the interior of said manifold and able to rotate within said manifold, comprising a value relief for each set of radial system ports for allowing fluid, when provided, to flow among at least two radially adjacent ports;
   (c) a resilient valve sealing means, for each set of radial system of ports, which is attached to said valve stem assembly and which extends outwardly from the circumference of the valve stem assembly, for blocking off at least one port in each set of radial system ports;
   (d) axial sealing mens between each set of radial system ports for preventing leakage from said valve reliefs;
   (e) a leak detection and venting port between each set of radial system ports for venting and detecting leakage past the axial sealing means;
   (f) switching means, attached to said valve stem assembly, for rotating said valve stem assembly such that said valve reliefs and valve sealing means may be rotated to different radially adjacent ports; and
   (g) attachment means for attaching said switching means to said valve stem assembly;
   whereby during operation of said apparatus, said switching means rotates said valve stem assembly, said resilient valve sealing means are thereby positioned such that fluid is prevented from flowing through at least one additional port which is radially adjacent to said system inlet port and through at least one additional port which is radially adjacent to said system outlet port, and said valve reliefs are thereby positioned to allow fluid to flow into said system inlet port and through at least one of the remaining additional ports which is radially adjacent to said system inlet port and to flow from at least one of the remaining additional ports which is radially adjacent to said system outlet port into said system outlet port.

2. An apparatus in accordance with claim 1, further comprising travel-limiting means for preventing the rotation of said switching means and said valve stem assembly beyond a designated position.

3. An apparatus in accordance with claim 1, further comprising locking means for locking said selecting means into position after said selecting means and valve stem assembly are seated in a designated position.

4. An apparatus in accordance with claim 1 wherein said valve relief is generally bell-shaped.

5. An apparatus in accordance with claim 1 wherein said resilient valve sealing means is convex shaped.

6. An apparatus in accordance with claim 1 wherein said axial sealing means comprises at least one O-ring between each radial system port and said leak detection and venting port.

* * * * *